United States Patent [19]

Scheuering

[11] Patent Number: 4,563,043
[45] Date of Patent: Jan. 7, 1986

[54] DUAL-CIRCUIT MASTER VALVE

[75] Inventor: Hans Scheuering, Ebern, Fed. Rep. of Germany

[73] Assignee: FAG Kugelfisher Georg Schafer Kommanditelgesellschaft Auf Aktien, Fed. Rep. of Germany

[21] Appl. No.: 567,267

[22] Filed: Dec. 30, 1983

[30] Foreign Application Priority Data

Jan. 7, 1983 [DE] Fed. Rep. of Germany ....... 3300267

[51] Int. Cl.$^4$ ............................................. B60T 15/06
[52] U.S. Cl. .................... 303/52; 137/627.5; 188/56
[58] Field of Search ........................ 303/10, 11, 56, 52, 303/13, 50, 54, 6 R; 60/589; 91/460; 137/627.5; 188/345, 151 A

[56] References Cited

U.S. PATENT DOCUMENTS

| | | | |
|---|---|---|---|
| 3,459,226 | 8/1969 | Schultz | 303/52 |
| 3,684,330 | 8/1972 | Kito | 303/10 |
| 3,724,210 | 4/1973 | Kobashi et al. | 188/345 |
| 3,870,377 | 3/1975 | Belart et al. | 188/114 |
| 4,452,267 | 6/1984 | Ott et al. | 137/627.5 |

FOREIGN PATENT DOCUMENTS 2952035 2/1981 Fed. Rep. of Germany ........ 303/52
2941781 5/1981 Fed. Rep. of Germany ........ 303/52

*Primary Examiner*—Duane A. Reger
*Assistant Examiner*—Alvin Oberley
*Attorney, Agent, or Firm*—Ostrolenk, Faber, Gerb & Soffen

[57] ABSTRACT

A dual-circuit master valve for hydraulically actuated power brakes is disclosed. An equalizing device in the valve assures a uniform build-up of pressure in both brake circuits. Even if one brake circuit fails, the equalizing device assures dependable operation of the remaining brake circuit without additional parts. The equalizing device includes at least one pressing member which acts on two conical valve slides, each having an opening facing the pressing member. The end of the pressing member facing the valve slides is provided with elastic material, preferably rubber or plastic, which deforms to equalize pressure when the pressing member presses against the openings in the valve slides.

6 Claims, 2 Drawing Figures

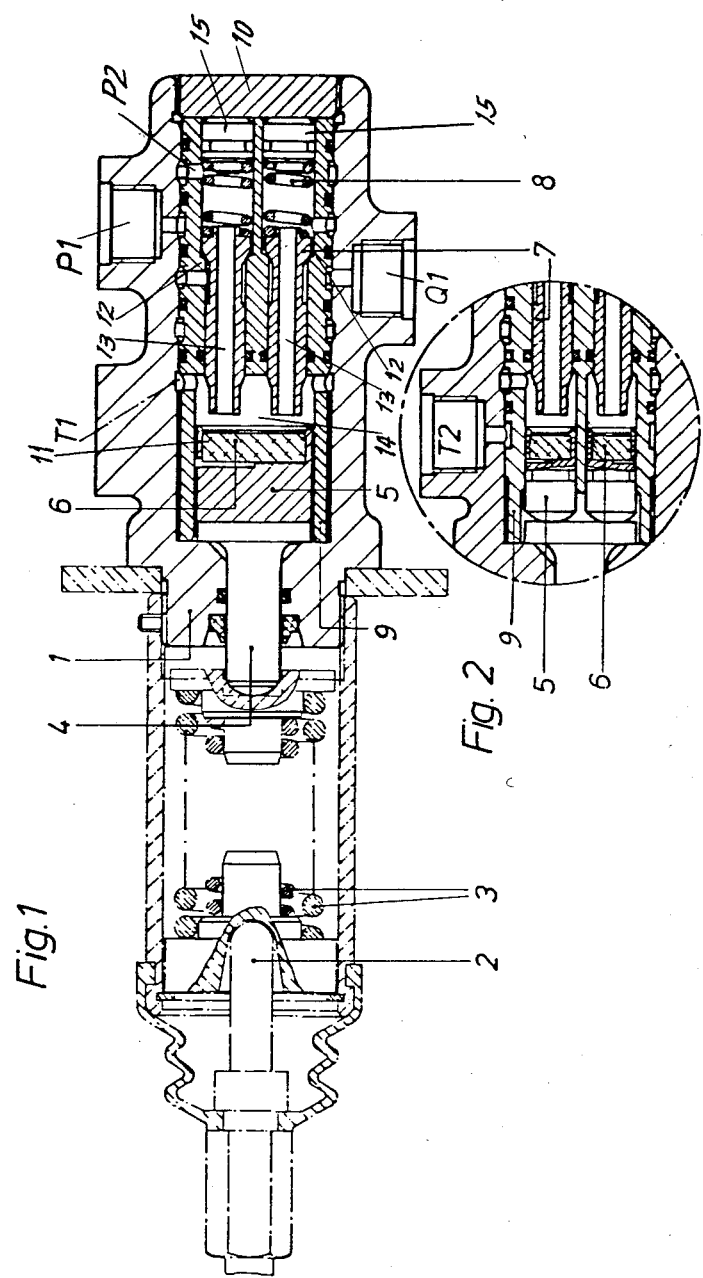

DUAL-CIRCUIT MASTER VALVE

BACKGROUND OF THE INVENTION

1. Field of the Invention

The present invention relates to a dual-dircuit master valve for hydraulically actuated power brakes.

2. Description of the Prior Art

German Unexamined Patent Application DE-OS No. 29 52 035 discloses a hydraulic dual-circuit power brake having a brake valve which has two ram-actuated individual valves. The rams are in functional connection with each other via an equalization lever. The equalization lever serves to assure a uniform build-up of pressure in both brake circuits.

Also, German Unexamined Patent Application DE-OS No. 29 41 781 discloses a main brake cylinder for a hydraulically actuatable dual-circuit vehicle brake system whose actuating rams are actuated via an equalizing device which is formed as a balance beam. The balance beam serves to produce the same hydraulic pressure in both brake circuits despite unavoidable irregularities resulting from materials and construction.

The equalizing devices which are formed as balance beams have a complicated construction, including balance beams, springs and counterpieces. In addition, when one brake circuit fails, dependable operation of the remaining brake circuit is not assured without additional expensive countermeasures.

SUMMARY OF THE INVENTION

The primary object of the present invention is therefore to provide a dual-circuit brake valve for hydraulically actuated power brakes in which a simple device assures a uniform pressure build-up in both brake circuits and in which, if one brake circuit fails, dependable operation of the remaining brake circuit is assured without additional devices or parts.

This and other objects of the invention ar achieved by a master valve in which two conical valve slides mounted in parallel slide openings control the flow of fluid in two respective brake circuits. Each valve slide has an open end with an opening for fluid flow, and these open ends face a pressing member. The pressing member responds to an actuating force by pressing against the open ends of the valve slides to overcome a biasing force and move the valve slides. An elastic material mounted to the pressing member fits against the open end of each valve slide and covers each opening.

Since the counteracting biasing forces from each slide valve may be unequal, the elastic material in contact with each slide valve will deform to different degrees. This acts to equalize pressure in the two brake circuits by controlling the size of the opening into the two brake circuits. The unequal counteracting forces may result from differences in the respective lengths of the slide valves, different filling values in the two brake circuits or leaks in them, or different resiliency in the springs which force the slide valves against the elastic material.

In an alternative embodiment, the slide openings are extended and each slide opening extension contains a pressing member. A single ram drives both pressing members, but each pressing member has elastic material mounted on it.

The elastic material on each pressing member facing the valve slides assures a simultaneous and uniform build-up of pressure, despite irregularities in the two brake circuits as a result of tolerances. Upon the failure of one brake circuit, the other brake circuit remains fully operative with no need to increase the pedal stroke or take other steps.

Other objects, features and advantages of the invention will be apparent from the following description, together with the accompanying drawings and the appended claims.

BRIEF DESCRIPTION OF THE DRAWINGS

FIG. 1 shows a longitudinal cross-sectional view of a dual-circuit master valve according to one embodiment of the invention, with a single valve-actuating pressing member.

FIG. 2 shows an alternative embodiment of the invention, with two pressing members.

DETAILED DESCRIPTION OF THE PREFERRED EMBODIMENTS

FIG. 1 shows an example of a master valve in which a generally cylindrical valve housing 1 has an inlet connection Q1 for receiving fluid under pressure from a pump (not shown) and a tank connection T1 between pressing chamber 14 in valve housing 1 and an external tank (not shown). In addition, two outlet connections P1, P2 lead to brake cylinders (not shown).

The general operation of the master valve may be understood by following the path of fluid through the valve housing 1. Fluid under pressure enters valve housing 1 through inlet connection Q1. If an actuating force is applied through piston rod 2, springs 3, ram 4 and pressing member 5, conical valve slides 7 move away from valve seats 12, permitting the fluid to flow through outlet chambers 15 to outlet connections P1, P2. This operates the brakes (not shown). When pressing member 5 is released, valve springs 8 push valve slides 7 against valve seats 12, stopping the fluid from connection Q1 from entering outlet chambers 15. Then pressing member 5 pulls away from the open ends of the central openings 13 in valve slides 7. This permits the fluid to return from the brakes (not shown) thus releasing pressure on the brakes. The fluid reenters valve housing 1 through connections P1, P2 and passes through the central openings 13 in valve slides 7 to the open ends facing pressing member 5. Because pressing member 5 has been released, the fluid may flow through pressing chamber 14 to tank connection T1, from which it is conducted to a tank (not shown).

Turning to the detailed operation of the invention, when the valve is actuated by a force exerted on piston rod 2, piston rod 2 and springs 3 apply the actuating force to ram 4 in the pressing chamber 14. Ram 4, in turn, applies a force to pressing member 5. A plate or disc of elastic material 6 is arranged on the end of pressing member 5 facing away from ram 4. In the embodiment shown in FIG. 1, elastic material 6 is mounted inside an outer circumferential rim 11 at the end of pressing member 5. In response to the actuating force, pressing member 5 moves axially, carrying elastic material 6 towards the two conical valve slides 7 mounted in respective slide openings, until elastic material 6 pushes against and moves valve slides 7. The slide openings are parallel and extend from pressing chamber 14 toward connections P1, P2. Ram 4, pressing member 5, and elastic material 6 thus function as pressing means for moving valve slides 7 in the slide openings. This movement controls the flow of fluid in the two brake circuits.

When elastic material 6 rests against conical valve slides 7, the path of fluid from connections P1, P2 through openings 13 to connection T1 is blocked and the equalization process caused by elastic material 6 begins. As can be seen from FIG. 1, the valve slides 7 can only be displaced by overcoming the opposing biasing force of valve springs 8. Until this biasing force is overcome, however, pressure irregularities resulting from tolerances are compensated by elastic deformation of elastic material 6. The balance beams used in the prior art are therefore unnecessary.

As soon as the biasing force of valve springs 8 has been overcome, valve slides 7 simultaneously open a path for the fluid under pressure from connection Q1 through outlet chambers 15 to connections P1, P2. The path of fluid through central openings 13 to tank connection T1 remains closed. The fluid under pressure passes through connections P1, P2 to the brakes (not shown) and actuates them.

In the event that a brake circuit should fail due to leakage in the fluid line, for instance, the remaining brake circuit will nevertheless continue to operate. No changes in the pedal stroke occur, in contrast to the prior art equalizing devices with balance beams. It will be necessary, of course, to include in each brake circuit a safety device (not shown) for maintaining pressure in that circuit if its fluid line should break. This could be done, for example, by a safety device of the type disclosed in U.S. Pat. No. 3,149,886, which is incorporated herein by reference. Such a safety device could be biased toward a closed position to prevent the flow of fluid from connection P1 or P2 to the rspective brake circuit unless the pressure from the master valve exceeds a predetermined value.

An additional feature of the invention is that pressing member 5, elastic material 6, valve slides 7 and valve springs 8 are arranged in an intermediate sleeve 9 which defines the pressing chamber 14 and the valve slide openings around valve slides 7. Sleeve 8 and valve springs 8 are held in a generally cylindrical axial bore in housing 1 by sealing plug 10. Therefore, the functionally important parts, which are machined with high precision, can be easily replaced without the difficult process of machining seal and guide seats in the cast cylinder housing 1.

FIG. 2 shows an alternative embodiment in which two pressing members 5 each press on a respective conical valve slide 7. Sleeve 9 includes a respective extension of each valve slide opening into the pressing chamber 14, and one pressing member 5 with attached elastic material 6 is slidably mounted in each extension. In this embodiment, each brake circuit has its own tank connection T1, T2, so that the fluid under pressure cannot flow out of one line if a leak occurs in the other line. Otherwise, the valve operates in the same manner as the embodiment of a dual-circuit master valve according to FIG. 1.

Although the present invention has been described in connection with a number of preferred embodiments thereof, many other variations and modifications will now become apparent to those skilled in the art. It is preferred, therefore, that the present invention be limited not by the specific disclosure herein, but only by the appended claims.

What is claimed is:

1. A dual-circuit master valve for hydraulically actuated power brakes, comprising:

a housing defining a pressing chamber and first and second valve slide openings connecting to the pressing chamber and extending in a first direction therefrom;

first and second valve slides slidably mounted in the first and second valve slide openings, respectively, each valve slide having an open end generally facing a second direction opposite the first direction and further having a fluid opening in the open end for flowing fluid; each valve slide being slidable in the first and second directions for controlling the flow of fluid in a respective brake circuit;

bias means for exerting a biasing force in the second direction for holding the first and second valve slides in a rest position; and pressing means mounted in the pressing chamber for exerting a pressing force in the first direction against the open ends of the first and second valve slides in response to an actuating force, the pressing force overcoming the biasing force and sliding the valve slides in the first direction, the pressing means comprising a pressing member slidably mounted in the pressing chamber and having a pressing end disposed toward the open ends of the first and second valve slides, an elastic material being mounted to the pressing end for fitting against the open ends of both the first and second valve slides for covering the respective fluid openings, the elastic material being deformable for equalizing pressure in the brake circuits.

2. The master valve of claim 1 in which the elastic material is rubber.

3. The master valve of claim 1 in which the elastic material is plastic.

4. The master valve of claim 1 in which the pressing means further comprises a ram mounted in the pressing chamber for driving the pressing member in the first direction.

5. The master valve of claim 1 in which the pressing end of the pressing member defines an outer rim, the elastic materal being mounted inside the outer rim.

6. The master valve of claim 1 in which the housing comprises a generally cylindrical housing defining a generally cylindrical axial bore and a sleeve mounted in the axial bore for defining the pressing chamber and the first and second valve slide openings.

* * * * *